(12) United States Patent
Wodrich et al.

(10) Patent No.: US 10,942,090 B2
(45) Date of Patent: Mar. 9, 2021

(54) METHOD FOR TESTING A VEHICLE POWER BRAKING SYSTEM

(71) Applicant: Robert Bosch GmbH, Stuttgart (DE)

(72) Inventors: Kevin Wodrich, Erlenbach (DE);
Tim-Philipp Jesse, Sachsenheim (DE);
Daniel Frank, Kleinsachsenheim (DE);
Peter Ziegler, Grossbottwar (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/526,264

(22) Filed: Jul. 30, 2019

(65) Prior Publication Data
US 2020/0056962 A1   Feb. 20, 2020

(30) Foreign Application Priority Data
Aug. 15, 2018  (DE) .................. 10 2018 213 752

(51) Int. Cl.
| | |
|---|---|
| *G01M 17/007* | (2006.01) |
| *B60T 17/08* | (2006.01) |
| *B60T 17/06* | (2006.01) |
| *B60T 13/14* | (2006.01) |

(52) U.S. Cl.
CPC ......... *G01M 17/007* (2013.01); *B60T 13/142* (2013.01); *B60T 17/06* (2013.01); *B60T 17/08* (2013.01)

(58) Field of Classification Search
CPC ..................................................... B60T 13/142
See application file for complete search history.

(56) References Cited

U.S. PATENT DOCUMENTS

| | | | |
|---|---|---|---|
| 2013/0278048 A1* | 10/2013 | Gerdes .................... | B60T 8/404 303/10 |
| 2015/0224972 A1* | 8/2015 | Feigel ..................... | B60T 11/26 303/15 |
| 2016/0046272 A1* | 2/2016 | Masur .................... | B60T 8/4086 303/15 |
| 2016/0152219 A1* | 6/2016 | Besier ..................... | B60T 7/042 303/15 |
| 2018/0015912 A1* | 1/2018 | Foitzik .................. | B60T 8/1761 |
| 2018/0118183 A1* | 5/2018 | Spieker ................. | B60T 13/662 |

FOREIGN PATENT DOCUMENTS

WO   2012150120 A1   11/2012

* cited by examiner

*Primary Examiner* — Paul M. West
*Assistant Examiner* — Mark A Shabman
(74) *Attorney, Agent, or Firm* — Norton Rose Fulbright Us LLP; Gerard Messina

(57) ABSTRACT

To test a vehicle power braking system, a piston of a power brake pressure generator is displaced twice for a pressure build-up and in between back preferably by a longer distance. Extension of the piston travel during the second displacement is an indication of air in a cylinder of the power brake pressure generator due to an excessively low brake fluid level in a brake fluid reservoir.

13 Claims, 2 Drawing Sheets

METHOD FOR TESTING A VEHICLE POWER BRAKING SYSTEM

CROSS REFERENCE

The present application claims the benefit under 35 U.S.C. § 119 of German Patent Application No. DE 102018213752.8 filed on Aug. 15, 2018, which is expressly incorporated herein by reference in its entirety.

FIELD

The present invention relates to a method for testing a vehicle power braking system.

BACKGROUND INFORMATION

A vehicle power braking system is described in International Patent Application No. WO 2012/150 120 A1. The described vehicle braking system includes a power brake pressure generator having a piston cylinder unit, the piston of which is displaceable in a cylinder via a screw drive with the aid of an electric motor for generating brake pressure.

Air, if it passes into the brake fluid of such a vehicle power braking system, is unnoticeable by a vehicle driver, because a displacement distance of the piston of the power brake pressure generator is increased with no retroactive effect on, for example, the foot brake pedal or a handbrake lever or with no other effect apparent to the vehicle driver.

SUMMARY

An example method according to the present invention is provided for testing a vehicle power braking system, which includes a power brake pressure generator having a piston-cylinder unit, the cylinder of which communicates with a, in particular, pressureless brake fluid reservoir. To generate brake pressure, a piston of the piston-cylinder unit, which may also be understood as a piston of the power brake pressure generator, is displaceable in the cylinder via a screw drive with the aid of an electric motor, whereby on the other hand the cylinder may also be displaceable on the piston. The screw drive is a ball screw drive, for example. Instead of a screw drive, another rotation-translation transition gear is also usable. A mechanical reduction gear may be situated between the electric motor and the screw drive. The electric motor, the screw drive and, if necessary, the reduction gear are parts of the power brake pressure generator.

The cylinder of the power brake pressure generator communicates with the brake fluid reservoir through a first and or a second brake fluid line. The first brake fluid line is sealable by a displacement of the piston in the cylinder from an initial position for a brake pressure build-up. The second brake fluid line includes a return valve through which a flow may pass in the direction of the cylinder.

The cylinder of the power brake pressure generator is connected by one or multiple separating valves to other parts of the vehicle power braking system, in particular, to hydraulic wheel brakes, and may be hydraulically separated from the other parts of the vehicle power braking system by closing the separating valve or valves. A pressure sensor is connected to the cylinder of the power brake pressure generator.

To test according to the present invention the vehicle power braking system, the separating valve or valves is/are or is to be/are to be closed and the first brake fluid line is sealed, so that a volume of brake fluid is trapped in the cylinder of the power brake pressure generator. The piston of the power brake pressure generator is displaced twice for a brake pressure build-up and in between displaced back by another distance so that at the start of the initial displacement for the brake pressure build-up, the piston is in a position in the cylinder different from that at the start of the second displacement for the brake pressure build-up. The piston is, in particular, displaced further back in the cylinder between the two displacements for the brake pressure build-up than it was displaced during the first displacement for the pressure build-up.

The pressure in the cylinder of the power brake pressure generator is measured during or at the end of the displacements of the piston. Resultant deviations from a standard, calculated, or expected pressure or pressure gradient are an indication of a flaw in the vehicle power braking system. The pressure in the cylinder of the power brake pressure generator is assessed in relation to a position or to the displacement of the piston in the cylinder.

If, for example, a displacement distance of the piston for generating a particular pressure is longer during its second displacement for the pressure build-up than during its first displacement, then air has presumably passed into the cylinder of the power brake pressure generator during the return displacement, which is an indication of an excessively low brake fluid level in the brake fluid reservoir. Other flaws or causes are not precluded.

If the piston of the power brake pressure generator is displaced further back in the cylinder between its two displacements for the brake pressure build-up than it was during its first displacement for the brake pressure build-up, then the brake fluid flows out of the brake fluid reservoir through the second brake fluid line and through the return valve situated in the second brake fluid line into the cylinder, provided the vehicle power braking system is in order and fully functional. To generate the same brake pressure, the piston in this case must be displaced equally far in the cylinder during its two displacements for the brake pressure build-up. Because the piston has been displaced further back between its two displacements for the brake pressure build-up than during its first displacement for the brake pressure build-up, it no longer reaches the same position in the cylinder during its second displacement for the brake pressure build-up as during its first displacement for the brake pressure build-up. If the displacement distance of the piston is longer during its second displacement for the brake pressure build-up and a pressure gradient (ratio of pressure change to displacement distance of the piston) is the same or similar to the first displacement, it may be concluded that during the return displacement of the piston no brake fluid or too little brake fluid has flowed from the brake fluid reservoir into the cylinder of the power brake pressure generator during the first displacement, i.e., the second brake fluid line or the return valve exhibits a reduced through-flow or no through-flow.

Refinements and advantageous embodiments of the present invention are described herein.

All features described in the description and in the figures may be implemented individually or in fundamentally arbitrary combination in specific embodiments of the present invention. Embodiments of the present invention, which include not all, but only one or multiple features are, in principle, possible.

BRIEF DESCRIPTION OF THE DRAWINGS

The present invention is explained in greater detail below with reference to a specific embodiment depicted in the figures.

DETAILED DESCRIPTION OF THE DRAWINGS

Figure 1:
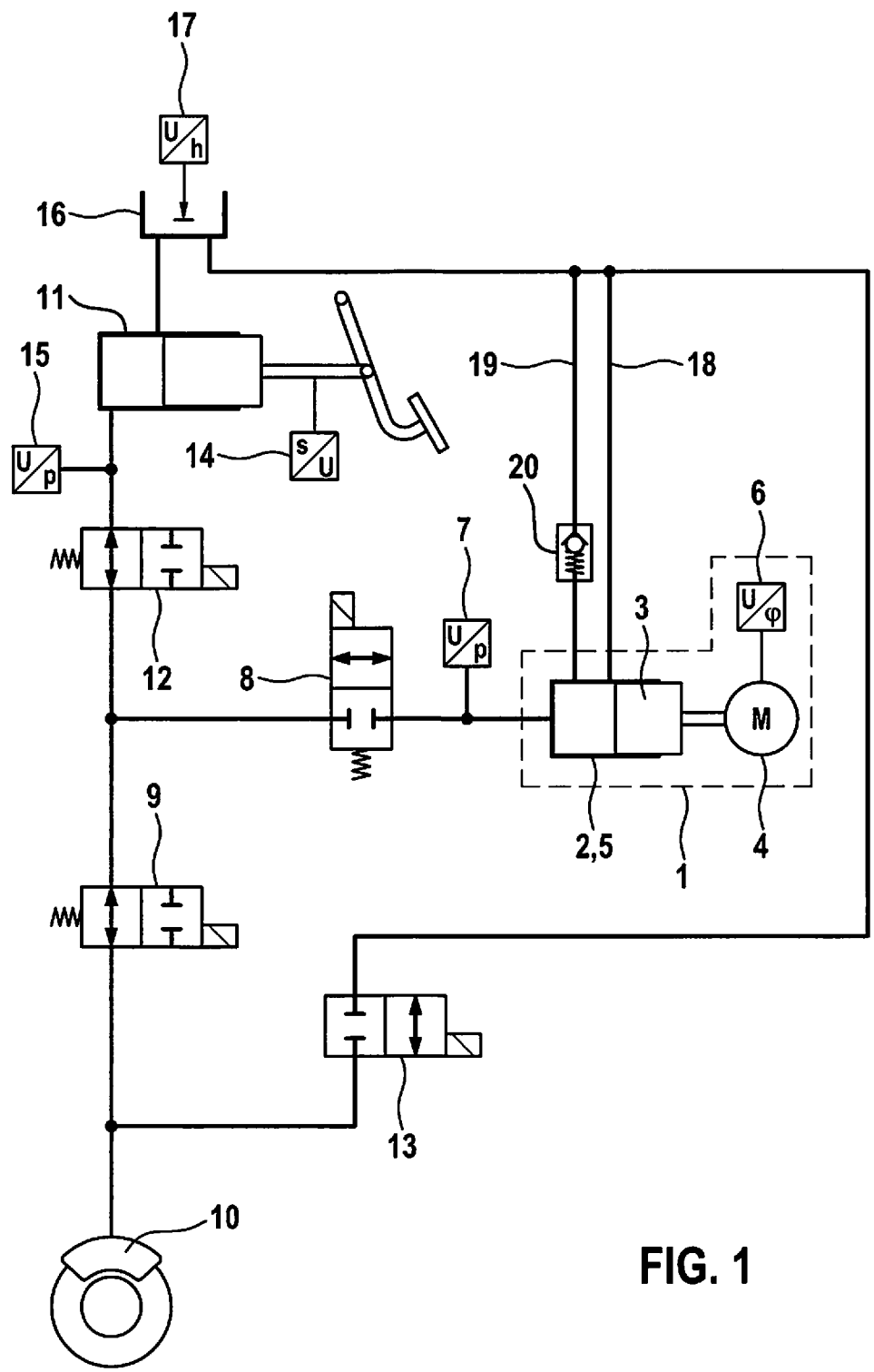
FIG. 1 shows a simplified hydraulic circuit diagram of a vehicle power braking system for carrying out the method according to the present invention.

The vehicle power braking system depicted in FIG. 1 includes a power brake pressure generator 1 having a piston-cylinder unit 2, the piston 3 of which is displaceable via a screw drive with the aid of an electric motor 4 with a reduction gear interposed in a cylinder 5 of piston-cylinder unit 2 for generating braking pressure. Electric motor 4 includes a rotation angle sensor 6, with which a rotational position of a rotor or a motor shaft of electric motor 4 may be measured. A rotation of the rotor or of the motor shaft of electric motor 4 is proportional to a displacement of piston 3 in cylinder 5, for which reason a position and a displacement distance of piston 3 in cylinder 5 may be calculated from the rotational position and from a rotational angle of the rotor or of the motor shaft of electric motor 4. Piston 3 and cylinder 5 of piston-cylinder unit 2 of power brake pressure generator 1 may also be understood as piston 3 and cylinder 5 of power brake pressure generator 1.

A pressure sensor 7 is connected to cylinder 5 of power brake pressure generator 1.

One or multiple hydraulic wheel brakes 10 are connected via a separating valve 8 and an inlet valve 9 to cylinder 5 of piston-cylinder unit 2 of power brake pressure generator 1.

A brake master cylinder 11 actuatable by muscular force is connected to the vehicle braking system by a separating valve 12 between separating valve 8 of power brake pressure generator 1 and inlet valve or inlet valves 9 of wheel brake or wheel brakes 10. During power braking, brake master cylinder 11 serves as a setpoint value generator for a brake pressure to be generated using power brake pressure generator 1 and/or wheel brake pressures in wheel brakes 10 to be regulated using inlet valves 9 and outlet valves 13. Brake master cylinder 11 therefore includes a pedal travel sensor 14 and/or a pressure sensor 15. During a power braking, separating valve 12 of brake master cylinder 11 is closed or is to be closed and brake master cylinder 11 is thereby hydraulically separated from other parts of the vehicle power braking system, in particular, from wheel brakes 10 and from power brake pressure generator 1.

For a power braking, separating valve 8 of power brake pressure generator 8 is opened and the brake pressure is generated using power brake pressure generator 1. In the event of a flaw in or malfunction of power brake pressure generator 1, it is possible to actuate vehicle power braking system using brake master cylinder 11, which is actuatable by muscular force.

FIG. 1 shows a single circuit vehicle braking system. A dual-circuit or multi-circuit vehicle braking system embodiment is also possible by connecting multiple wheel brakes 10 via multiple separating valves 8 hydraulically in parallel to cylinder 5 of power brake pressure generator 1 and via multiple separating valves 12 hydraulically in parallel to brake master cylinder 11 (not depicted).

Separating valve 8 of power brake pressure generator 1 and outlet valves 13 of wheel brakes 10 are closed 2/2 way solenoid valves in their currentless initial positions and separating valve 12 of brake master cylinder 11 and inlet valves 9 of wheel brakes 10 are open 2/2 way solenoid valves in their currentless initial positions. Other embodiments are possible.

Brake master cylinder 11 includes a pressureless brake fluid reservoir 16, to which wheel brakes 10 are also connected via outlet valves 13. Brake fluid reservoir 16 includes a fill level sensor 17, with which a fill level of brake fluid reservoir 16 may be measured or a drop below an established minimum fill level is detectable. Each wheel brake 10 includes an inlet valve 9 and an outlet valve 13, with which wheel brake pressures may be regulated in each wheel brake 10 and slip controls may be carried out in a manner known per se. Such slip controls are, in particular, anti-lock controls, drive slip controls and driving dynamic controls/electronic stability programs, for which the abbreviations ABS, ASR and FDR/ESP are common.

Cylinder 2 of power brake pressure generator 1 is connected by a first brake fluid line 18 and a second brake fluid line 19 to brake fluid reservoir 16. First brake fluid line 18 is sealed by piston 3 when the piston is displaced a short distance from its initial position for a brake pressure build-up. A return valve 20, through which a flow may pass in the direction of cylinder 5 is situated in second brake fluid line 19.

To test according to the present invention the vehicle power brake system, piston 3 of power brake pressure generator 1 is displaced into a position in cylinder 5, in which it seals first brake fluid line 18. This position is identified by I in the diagram of FIG. 2. Cylinder 5 is pressureless, which is achievable by opening separating valve 8 of power brake pressure generator 1 so that piston 3 forces brake fluid through open separating valve 8 of power brake pressure generator 1, through open separating valve 12 of brake master cylinder 11 and through brake master cylinder 11 into pressureless brake fluid reservoir 16. Alternatively or in addition, outlet valve 13 of at least one wheel brake 10 may be opened, so that piston 3 of power brake pressure generator 1 forces brake fluid through separating valve 8 of power brake pressure generator 1 and through inlet valve 9 and outlet valve 13 of the one or multiple wheel brakes 10 into brake fluid reservoir 16.

At the beginning of the test, separating valve 8 of power brake pressure generator 1 is closed, so that the brake fluid is trapped in cylinder 5 of power brake pressure generator 1, because piston 3 seals first brake fluid line 18. Brake fluid is able to flow only through return valve 20 in second brake fluid line 19 into cylinder 5 of power brake pressure generator 1. Piston 3 is displaced a short distance back into the position identified by II in FIG. 2 in order to ensure the zero pressure of cylinder 5. Position II in itself is the starting position of piston 3 at the beginning of the test.

Starting from position II with pressureless cylinder 5, piston 3 of power brake pressure generator 1 is displaced a first time for a brake pressure build-up by an established distance or until an established pressure in cylinder 5 is reached. The position of piston 3 at the end of the first displacement for the pressure build-up is identified by III in FIG. 2. The pressure increase in cylinder 5 of power brake pressure generator 1 is depicted in the diagram of FIG. 3.

Figure 2:
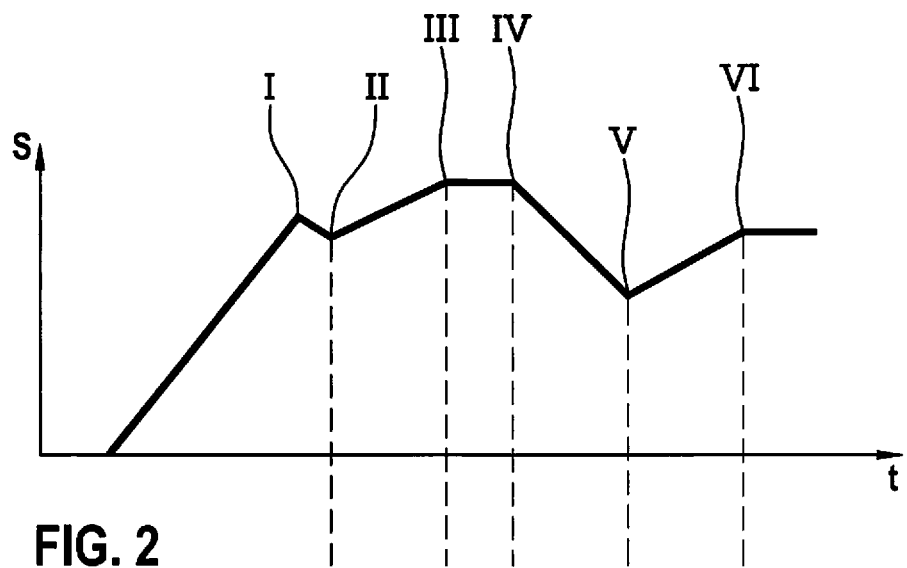
FIG. 2 shows a piston travel diagram.
Figure 3:
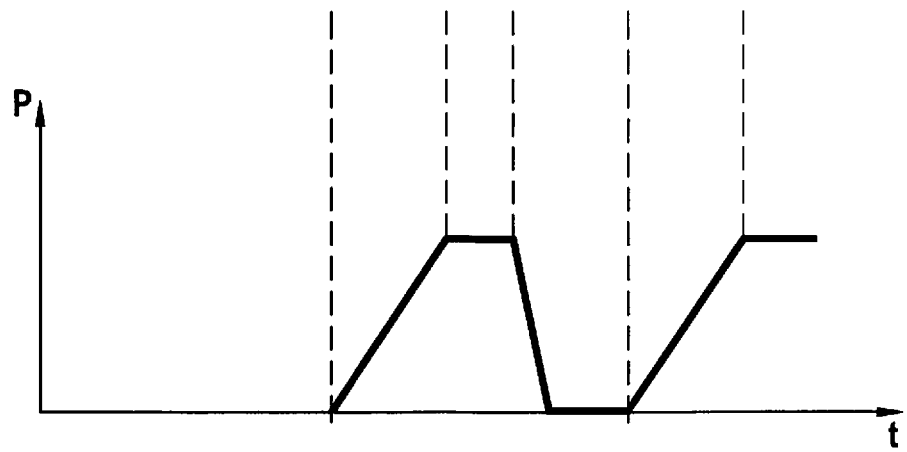
FIG. 3 shows a pressure diagram.

After a standstill phase of piston 3 for maintaining pressure, which ends at "IV", piston 3 is displaced back in cylinder 5 in the direction opposite to the pressure build-up into the position identified by V in FIG. 2. The backward displacement of piston 3 is preferably longer than the first displacement for the pressure build-up from position II into position III. Due to the longer backward displacement, piston 3 draws brake fluid from brake fluid reservoir 16 through first brake fluid line 19 and return valve 20 into cylinder 5. Piston 3 is not displaced so far backward that it opens first brake fluid line 18.

Following the backward displacement, piston 3 is displaced a second time for the pressure build-up in cylinder 5, specifically, in particular, by the same distance as during the first displacement for the pressure build-up or until the same pressure is reached. The end of the second displacement of piston 3 for the pressure build-up is identified by VI in FIG. 2, a standstill phase of piston 3 follows once again for maintaining pressure in cylinder 5, after which piston 3 may be displaced back into its initial position, in which it opens first brake fluid line 18. During the test described, piston 3 never reaches this initial position, but always keeps first brake fluid line 18 sealed.

If piston 3 requires a longer distance from position V into position VI during its second displacement for the pressure build-up in order to generate the established pressure, or if, given the same displacement distance, the pressure build-up is lower than in the first displacement for the pressure build-up, it is assumed that during the backward displacement of piston 3 between the two displacements for the pressure build-up, air has passed from brake fluid reservoir 16 through second brake fluid line 19 and return valve 20 into cylinder 5 of power brake pressure generator 1. The cause of this may be an excessively low brake fluid level in brake fluid reservoir 16. If fill level sensor 17 accordingly indicates an excessively low brake fluid level, then brake fluid must be added. If fill lever sensor 17 indicates a sufficient brake fluid level, then fill level sensor 17 must be checked and/or changed.

Another cause of a lower pressure build-up and/or of a longer piston travel during the second displacement of piston 3 for the pressure build-up may be a non-opening or not completely opening return valve 20, so that no brake fluid or too little brake fluid passes into cylinder 5 during the backward displacement of piston 3. It is, in particular, an indication of a possibly non-opening return valve 20 if piston 3 must be displaced into the same position during its second displacement for the pressure build-up as it was during its first displacement for the pressure build-up, even though the backward displacement was longer. This applies, in particular, if a pressure gradient is the same or similar during both displacements. The pressure gradient is the ratio of pressure change to displacement distance.

What is claimed is:

1. A method for testing a vehicle power braking system, the vehicle power braking system including a power brake pressure generator, the power brake pressure generator including a piston and a cylinder, wherein the piston is displaceable in the cylinder in a first direction by power to thereby generate a brake pressure, the cylinder is hydraulically separable from other parts of the vehicle power braking system by closing a separating valve, (a) the cylinder can communicate with a brake fluid reservoir through a first brake fluid line, which is sealable by a displacement of the piston in the cylinder in the first direction from an initial position of the piston for a brake pressure build-up, and/or (b) the cylinder can communicate with the brake fluid reservoir through a second brake fluid line that includes a return valve through which a flow can pass only in a direction from the brake fluid reservoir to the cylinder, and the vehicle power braking system includes a pressure sensor connected to the cylinder of the power brake pressure generator, the method comprising:

executing a sequence of displacements of the piston in the cylinder during an entirety of which the separating valve is closed and during the entirety of which brake fluid in the cylinder at a start of the sequence cannot be returned from the cylinder to the brake fluid reservoir, so that all of the brake fluid that is in the cylinder during the executed sequence is trapped in the cylinder, wherein the sequence includes:
   during a first pressure-build-up displacement, displacing the piston in the cylinder in the first direction for a first brake pressure build-up in the cylinder of the sequence;
   subsequent to the first pressure-build-up displacement displacing the piston in the cylinder in a second direction that is opposite to the first direction; and
   during a second pressure-build-up displacement that takes place subsequent to the displacement in the second direction, displacing the piston in the cylinder in the first direction for a second brake pressure build-up in the cylinder of the sequence;
   measuring a characteristic of at least the second brake pressure build-up-displacement of the sequence; and
   determining whether the vehicle power braking system is faulty based on the measured characteristic.

2. The method as recited in claim 1, wherein the displacement of the piston in the second direction between the first and second pressure-build-up displacements displaces the piston by a greater distance than a distance by which the first pressure-build-up displacement displaces the piston.

3. The method as recited in claim 1, wherein a displacement distance of the piston in the cylinder during the first and second displacements for the brake pressure build-up are equally long.

4. The method as recited in claim 1, further comprising, prior to the execution of the sequence, displacing the piston into a position in which (a) the piston seals the first brake fluid line, thereby preventing escape of the brake fluid in the cylinder over the first brake fluid line to the brake fluid reservoir, the first brake fluid line being separate from a line that includes the separating valve, and (b) the cylinder of the power brake pressure generator is pressureless, wherein the first brake fluid line thereafter remains sealed by the piston until after the execution of the sequence.

5. The method as recited in claim 1, wherein the brake fluid reservoir includes a fluid sensor.

6. The method as recited in claim 1, wherein the measured characteristic is a displacement distance.

7. The method as recited in claim 6, wherein the displacement distance is measured for each of the first and second brake pressure build-up-displacements, and the determination of whether the vehicle power braking system is faulty is made based on a comparison of the respective measured displacement distances of the first and second brake pressure build-up-displacements.

8. The method as recited in claim 1, wherein the measured characteristic is a pressure.

9. The method as recited in claim 8, wherein the pressure is measured for each of the first and second brake pressure build-up-displacements, and the determination of whether the vehicle power braking system is faulty is made based on a comparison of the respective measured pressures of the first and second brake pressure build-up-displacements.

10. The method as recited in claim 1, wherein the cylinder can communicate with the brake fluid reservoir through the first brake fluid line, which is sealable by the displacement of the piston in the cylinder in the first direction from the initial position of the piston, and the cylinder can communicate with the brake fluid reservoir through the second brake fluid line that includes the return valve through which the flow can pass only in the direction from the brake fluid reservoir to the cylinder.

11. A method for testing a vehicle power braking system, wherein the vehicle power braking system includes a power brake pressure generator, the power brake pressure generator includes a piston and a cylinder, the piston is displaceable in the cylinder in a first direction by power in the cylinder to thereby generate a brake pressure, the cylinder is hydraulically separable from other parts of the vehicle power braking system by closing a separating valve, the vehicle power braking system includes at least one brake fluid line between the cylinder and a brake fluid reservoir, (a) the cylinder can communicate with the brake fluid reservoir through a first brake fluid line of the at least one brake fluid line, the first brake fluid line being sealable by a displacement of the piston in the cylinder in the first direction from an initial position of the piston, and/or (b) the cylinder can communicate with the brake fluid reservoir through a second brake fluid line of the at least one brake fluid line, the second brake fluid line including a return valve through which a flow can pass only in a direction from the brake fluid reservoir to the cylinder, and the vehicle power braking system includes a pressure sensor connected to the cylinder of the power brake pressure generator, the method comprising:

during a first pressure-build-up displacement, displacing the piston in the cylinder in the first direction for generating brake pressure;

while the separating valve is closed and while brake fluid cannot flow from the cylinder to the brake fluid reservoir over the at least one brake fluid line, displacing the piston in the cylinder in a second direction that is opposite to the first direction;

during a second pressure-build-up displacement displacing the piston in the cylinder in the first direction for a brake pressure build-up in the cylinder to a point that the brake pressure in the cylinder achieves a same value as at an end of the first pressure-build-up displacement of the piston;

measuring a respective value of a characteristic of each of the first pressure-build-up displacement and the second pressure-build-up displacement; and comparing the measured values of the first and second pressure-build-up displacements.

12. The method as recited in claim 11, wherein the measured values are respective displacement distances.

13. The method as recited in claim 11, wherein the measured values are respective pressures.

* * * * *